US012100097B2

United States Patent
Bigos et al.

(10) Patent No.: US 12,100,097 B2
(45) Date of Patent: Sep. 24, 2024

(54) IMAGE RENDERING METHOD AND APPARATUS

(71) Applicant: Sony Interactive Entertainment Inc., Tokyo (JP)

(72) Inventors: Andrew James Bigos, Staines (GB); Gilles Christian Rainer, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 181 days.

(21) Appl. No.: 17/699,887

(22) Filed: Mar. 21, 2022

(65) Prior Publication Data

US 2022/0309744 A1 Sep. 29, 2022

(30) Foreign Application Priority Data

Mar. 24, 2021 (GB) ..................................... 2104156

(51) Int. Cl.
*G06T 15/50* (2011.01)
*G06N 3/04* (2023.01)

(52) U.S. Cl.
CPC ............. *G06T 15/506* (2013.01); *G06N 3/04* (2013.01)

(58) Field of Classification Search
CPC .......... G06N 3/04; G06N 3/084; G06N 3/048; G06N 20/00; G06N 3/045; G06N 3/08; G06T 15/506; G06T 15/50; G06T 2207/20084; G06T 15/06; G06T 17/00; G06T 11/001; G06T 1/20; H04N 13/128; H04N 13/111; H04N 23/56; G06F 3/013;
(Continued)

(56) References Cited

U.S. PATENT DOCUMENTS

| 10,430,978 B2 | 10/2019 | Yumer |
| 11,436,793 B1 | 9/2022 | Schied |
| 11,637,998 B1 | 4/2023 | Pieper |

(Continued)

FOREIGN PATENT DOCUMENTS

| CN | 109509248 A | 3/2019 |
| CN | 111833430 A | 10/2020 |

(Continued)

OTHER PUBLICATIONS

Search report for corresponding GB Application No. GB2104156.1, 4 pages, dated Sep. 24, 2021.

(Continued)

*Primary Examiner* — Xilin Guo
(74) *Attorney, Agent, or Firm* — Matthew B. Dernier, Esq.

(57) ABSTRACT

An image rendering method for rendering a pixel at a viewpoint including: for a first element of a virtual scene, having a predetermined surface at a position within that scene, providing the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position, combining the predicted factor from the machine learning system with the distribution function to generate the pixel value corresponding to the illuminated first element of the virtual scene at the position, and incorporating the pixel value into a rendered image for display.

14 Claims, 8 Drawing Sheets

(58) Field of Classification Search
CPC ......... G06F 3/012; G06F 3/011; G06V 10/60; G06V 10/82; G06V 40/20
See application file for complete search history.

(56) References Cited

U.S. PATENT DOCUMENTS

| | | | |
|---|---|---|---|
| 2012/0327086 A1* | 12/2012 | Shimbaru | G06T 15/80 345/501 |
| 2013/0335434 A1 | 12/2013 | Wang | |
| 2014/0274391 A1 | 9/2014 | Stafford | |
| 2016/0162402 A1 | 6/2016 | Woolley, Jr | |
| 2018/0069932 A1 | 3/2018 | Tiwari | |
| 2018/0102858 A1 | 4/2018 | Tiwari | |
| 2018/0114096 A1 | 4/2018 | Sen | |
| 2018/0348860 A1 | 12/2018 | Lin | |
| 2020/0107423 A1 | 4/2020 | Harrison | |
| 2020/0143230 A1 | 5/2020 | Su | |
| 2020/0211157 A1 | 7/2020 | Pohl | |
| 2020/0211272 A1 | 7/2020 | Barczak | |
| 2020/0273231 A1 | 8/2020 | Schied | |
| 2020/0302684 A1 | 9/2020 | Sunkavalli | |
| 2020/0372284 A1 | 11/2020 | Rhemann | |
| 2021/0065440 A1 | 3/2021 | Sunkavalli | |
| 2021/0133473 A1 | 5/2021 | Oosake | |
| 2021/0294945 A1* | 9/2021 | Müller | G06F 17/11 |
| 2021/0295592 A1 | 9/2021 | von Cramon | |
| 2022/0301257 A1* | 9/2022 | Garbin | G06N 3/08 |
| 2022/0309736 A1 | 9/2022 | Bigos | |
| 2022/0405682 A1 | 12/2022 | Yoon | |

FOREIGN PATENT DOCUMENTS

| | | |
|---|---|---|
| CN | 112509109 A | 3/2021 |
| EP | 2261862 A1 | 12/2010 |
| EP | 3675045 A1 | 7/2020 |
| EP | 3789964 A1 | 3/2021 |
| GB | 2563115 A | 12/2018 |
| WO | 2018158347 A1 | 9/2018 |

OTHER PUBLICATIONS

Gardner Marc-Andre., et al., "Learning to Predict indoor illumination from a single image," ariv preprint aeXiv: 1704.00090, 14 pages, Apr. 1, 2017.
Extended European Search report for related EP Application No. 22161352.4, 11 pages, dated Oct. 28, 2022.
Theis Justus, et al., "Deferred neural rendering: Image Syntheses using Neural Textures" ACM Transactions on Graphics, NY, US, vol. 38, No. 4, 12 pages, Jul. 12, 2019 (For relevance, see Non-Pat. Lit. #1).
Giulio Jiang, et al., "Deep Radiance Caching: Convolutional Autoencoders Deeper in Ray Tracing" Computers & Graphics, Imperial College London, 11 pages, Jul. 30, 2020 (For relevance, see Non-Pat. Lit. #1).
Giuseppe Claudio Guarnera, et al., "BxDF material acquisition, representation, and rendering for VR and design" 21 pages, Nov. 17, 2019 (For relevance, see Non-Pat. Lit. #1).
Ben Mildenhall, et al. "NeRF: Representing Scenes as Neural Radiance Fields for View Synthesis." arXiv: arXiv:2003.08934, 25 pages, dated Aug. 3, 2020.
Search report for corresponding GB Application No. GB2104109, 4 pages, dated Sep. 21, 2021.
Search report for corresponding GB Application No. GB2104113.2, 4 pages, dated Sep. 23, 2021.
Combined Search and Examination report for corresponding GB Application No. GB2104111.6, 8 pages, dated Sep. 24, 2021.
Search report for corresponding GB Application No. GB2104110.8, 4 pages, dated Sep. 1, 2021.
Search report for corresponding GB Application No. GB2104114.0, 4 pages, dated Sep. 21, 2021.
Combined Search and Examination report for corresponding GB Application No. GB2104106.6, 8 pages, dated Sep. 24, 2021.
Combined Search and Examination Report for corresponding GB Application No. GB2104152, 7 pages, dated Sep. 21, 2021.
Extended European Search report for related EP Application No. 22162809.2, 11 pages, dated Sep. 22, 2022.
Zhang Chen et al., "A Neural Rendering Framework for Free-Viewpoint Relighting", IEEE/CVF Conference on Computer Vision and Pattern Recognition, pp. 5598-5609, Jun. 13, 2020 (See Non-Pat. Lit. #1).
Extended European Search report for related EP Application No. 22162501.5, 17 pages, dated Sep. 22, 2022.
Extended European Search report for related EP Application No. 22161342.5, 10 pages, dated Aug. 31, 2022.
Pratul P Srinivasan et al., "NeRV: Neural Reflectance and Visibility Fields for Relighting and View Synthesis", arxiv.org, Cornell University Library, pp. 1-12, Dec. 7, 2020 (See Non-Pat. Lit. #1).
Giulio Jiang et al., "One Shot Radiance: Global Illumination Using Convolutional Autoencoders", arxiv.org, Cornell University Library, pp. 1-11, Oct. 6, 2019, (See Non-Pat. Lit. #1).
Currius R Ret al., "Spherical Gaussian Light-field Textures for Fast Precomputed Global Illumination", Computer Graphics Forum : Journal of the European Association for Computer Graphics, Wiley-Blackwell, Oxford, vol. 39, No. 2, pp. 133-146, Jul. 13, 2020 (See Non-Pat. Lit. #1).
Peiran Ren et al., "Global illumination with radiance regression functions", ACM Transactions on Graphics, vol. 32, No. 4, p. 130:2-130:12, Jul. 1, 2013 (See Non-Pat. Lit. #1).
Extended European Search report for related EP Application No. 22161560.2, 15 pages, dated Aug. 31, 2022.
Terrance Devries et al., "Learning Confidence for Out-of-Distribution Detection in Neural Networks", arxiv.org, Cornell University Library, 12 pages, Feb. 13, 2018 (See Non-Pat. Lit. #6).
Extended European Search report for related EP Application No. 22161587.5, 21 pages, dated Aug. 31, 2022.
Angelos Katharopoulos et al., "Not All Samples Are Created Equal: Deep Learning with Importance Sampling", arxiv.org, Cornell University Library, 13 pages, Mar. 2, 2018 (See Non-Pat. Lit. #8).
Settles Burr, "Active Learning Literature Survey" URL:http://axon.cs.byu.edu/-martinez/classes/778/Papers/settles.activelearning.pdfc, 46 pages, Jan. 9, 2009 (See Non-Pat. Lit. #8).
Paul Sujoy et al., "Efficient selection of informative and diverse training samples with applications in scene classification", 2016 IEEE International Conference on Image Processing (ICIP) pp. 494-498, Sep. 25, 2016 (See Non-Pat. Lit. #8).
Zhang Cha et al., "Active Scene Capturing for Image-Based Rendering with a Light Field Setup", Electrical and Computer Engineering, URL:http://chenlab.ece.cornell.edu/Publication/Cha/tr03_02.pdf, pp. 1-16, Jan. 1, 2003 (See Non-Pat. Lit. #8).
Chloe Legendre et al., "DeepLight: Learning Illumination for Unconstrained Mobile Mixed Reality", 2019 IEEE/CVF Conference on Computer Vision and Pattern Recognition (CVPR), 11 pages, Jun. 1, 2019 (See Non-Pat. Lit. #8).
Zhe Chen et al., "Invertible Neural BRDF for Object Inverse Rendering", arxiv.org, pp. 1-9, Aug. 11, 2020 (See Non-Pat. Lit. #8).
Song Shuran et al., "Neural Illumination: Lighting Prediction for Indoor Environments", URL:https://openaccess.thecvf.com/content_CVPR_2019/papersSong_Neural_Illumination_Lighting_Prediction_for_Indoor_Environments_CVPR_2019_paper.pdf>, pp. 6918-6926, Jan. 1, 2019 (See Non-Pat. Lit. #8).
Ayush Tewari et al., "State of the Art on Neural Rendering", arxiv.org, Cornell University Library, vol. 39, No. 2, 27 pages, Apr. 8, 2020 (See Non-Pat. Lit. #8).
Extended European Search report for related EP Application No. 22166963.3, 9 pages, dated Sep. 2, 2022.
Michelle Guo, et al., "Object-Centric Neural Scene Rendering", arxiv.org, arXiv:2012.08503, pp. 1-10, Dec. 15, 2020.
Chiyu Jiang, et al., "ShapeFlow: Learnable Deformation Flows Among 3D Shapes", NIPS'20: Proceedings of the 34th International Conference on Neural Information Processing Systems, pp. 1-13, Dec. 6, 2020.

(56) References Cited

OTHER PUBLICATIONS

Chiyu Jiang, et al., "ShapeFlow: Supplementary Material", NIPS'20: Proceedings of the 34th International Conference on Neural Information Processing Systems, pp. 14-16, Dec. 6, 2020.

Ajay Shrestha, et al., "Review of Deep Learning Algorithms and Architectures", IEEE, IEEE Access, vol. 7, pp. 53040-53065, May 1, 2019.

* cited by examiner

IMAGE RENDERING METHOD AND APPARATUS

BACKGROUND OF THE INVENTION

Field of the Invention

The present invention relates to an image rendering method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ray tracing is a rendering process in which paths of light are traced within a virtual scene. The interactions of each ray with objects or surfaces within the scene are then simulated. To achieve a degree of realism, typically this simulation takes account of material properties of these objects or surfaces, such as their colour and reflectivity.

As a result, ray tracing is a computationally expensive process. Furthermore, that cost varies from image frame to image frame, depending on what scene is being illuminated, by what lights, and from what viewpoint.

This makes maintaining a preferred frame rate for rendering such images difficult to achieve; for an average computational cost corresponding to an average image completion time (i.e. a frame rate), and a given variance around that average caused by ray tracing, then either the average image quality has to be set low enough that the variance only rarely impacts the frame rate, or if the average image quality is set close to a maximum for the preferred frame rate, then the consistency of that frame rate must be sacrificed when varying ray tracing demands fluctuate above the average.

Neither outcome is desirable, but cannot easily be avoided whilst the computational burden of the ray tracing process is data-driven and unpredictable.

The present invention seeks to address or mitigate this problem.

SUMMARY OF THE INVENTION

Various aspects and features of the present invention are defined in the appended claims and within the text of the accompanying description and include at least:

in a first instance, an image rendering method in accordance with claim 1; and in another instance, an entertainment device in accordance with claim 13.

It is to be understood that both the foregoing general summary of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An image rendering method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present description seek to address or mitigate the above problem by using a machine learning system that learns the relationship between pixel surface properties and rendered pixels for a given object or scene; by using such a machine learning system, it is then possible to approximate a ray traced render of the object or scene based on a relatively consistent computational budget (that of running the machine learning system).

Different machine learning systems can be trained for different scenes, locations or parts thereof, or for different objects or materials for use within one or more scenes, as explained later herein.

The machine learning systems are comparatively small (typically in the order of 100 KB to 1 MB) and so for the purposes of being run by a GPU (30), may be pulled into memory and subsequently discarded like a texture of the scene. The systems can be run by shaders of the GPU. It will also be appreciated that in principle the machine learning systems could alternatively or in addition by run by a CPU (20) or by a general or specialist co-processor, such as a neural network processor or an ASIC.

Referring now to the drawings, wherein like reference numerals designate identical or corresponding parts throughout the several views, FIGS. 2-7 illustrate the problem space within which the machine learning system is trained.

Figure 2:
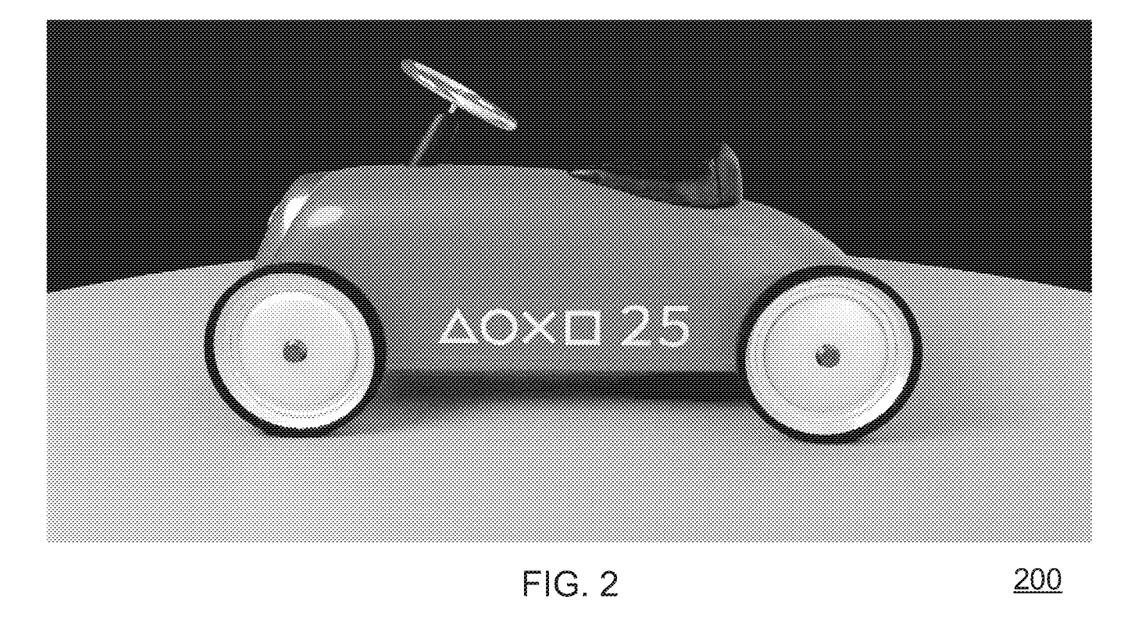
FIG. 2 is an illustration of a ray-traced object in accordance with embodiments of the present description.

FIG. 2 is a high-quality ray-traced render 200 of an example object or scene, in this case a car on a dais.

Figure 3:
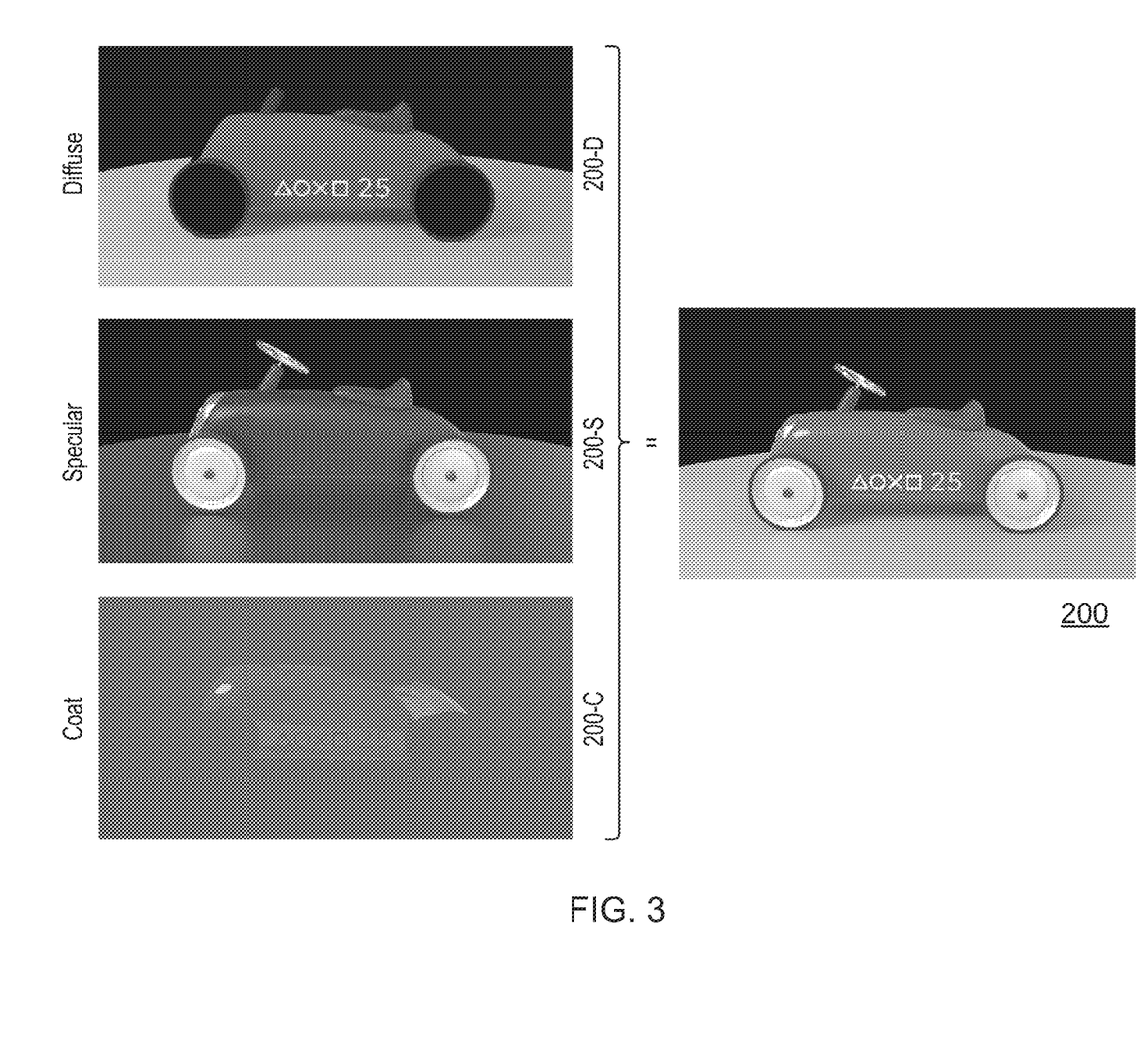
FIG. 3 is a schematic diagram of components contributing to the ray-traced object in accordance with embodiments of the present description.

FIG. 3 illustrates the different contributing components behind this render. Firstly, a diffuse lighting component 200-D typically captures the matt colours of the surface and the shading caused by the interaction of light and shape, whilst secondly a specular lighting component 200-S captures the reflectivity of the surface, resulting in glints and highlights. Optionally one or more additional components can be included, such as a sheen or 'coat' 200-C, which is a second outer surface that may comprise additional gloss or patterning. Variants of such a coat may allow for partial transparency and/or partial diffusion in a manner similar to skin or fabric, for example. Each of these components can be conventionally generated using a respective ray tracing process.

These components sum additively to form the overall image previously seen in FIG. 2. It will be appreciated that whilst typically 2 or 3 such components will contribute to a render, in some circumstances there may be fewer (for example if just a diffuse component is desired) or more (for example when the object is also translucent and so requires a transmissive component—e.g. for subsurface scattering).

Figure 4:
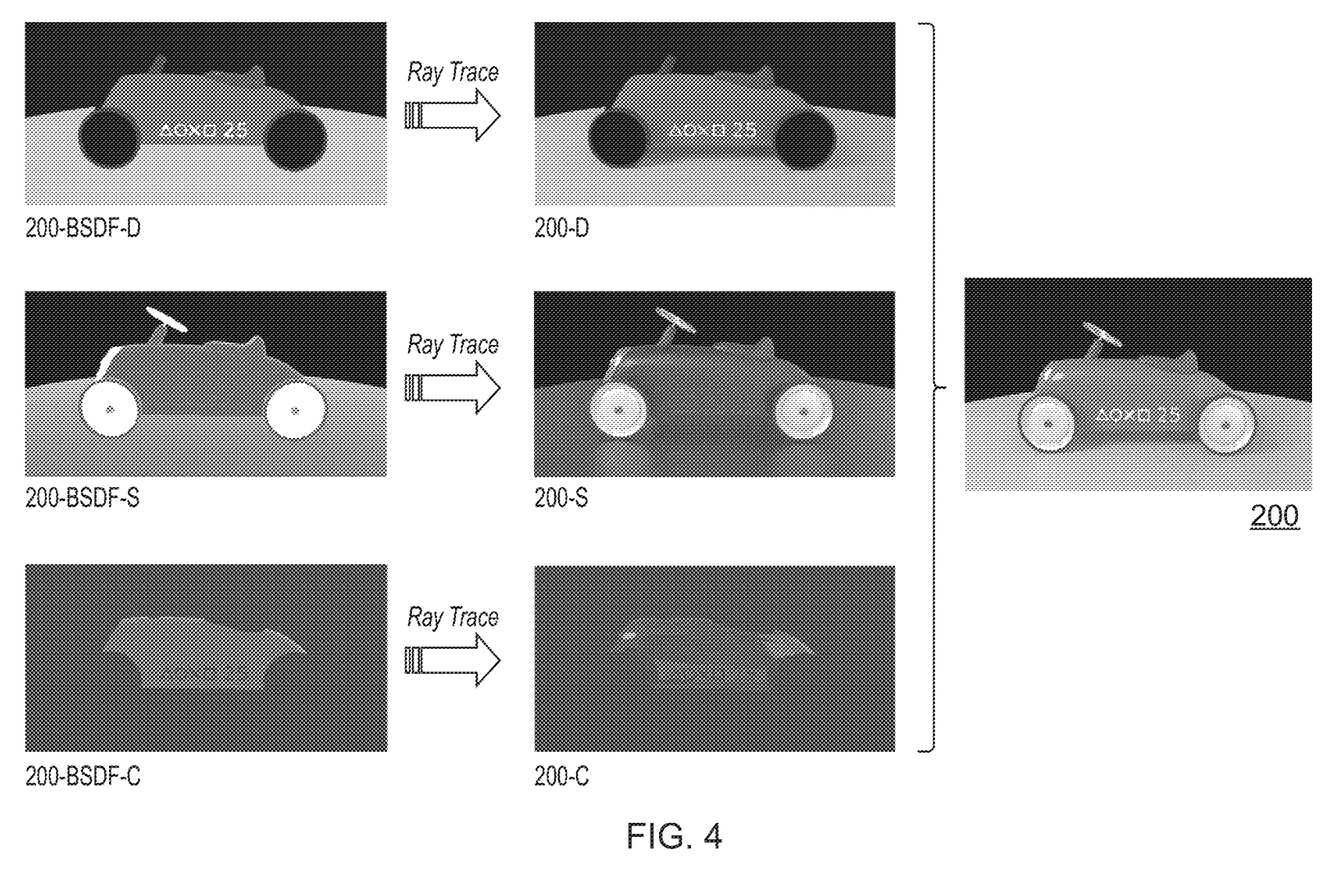
FIG. 4 is a schematic diagram of distribution functions associated with respective components in accordance with embodiments of the present description.

FIG. 4 next includes the material properties of the object that give rise to the above contributing components of the image.

The material property is expressed as a so-called bidirectional scattering distribution function (BSDF) or bidirectional reflectance distribution function (BRDF).

A BRDF defines how light is reflected at an opaque surface, whilst similarly a BSDF defines the probability that a ray of light will be reflected or scattered in a particular direction. Hence a BRDF or BSDF is a function that describes the lighting properties of a surface (excluding the incoming/outgoing radiance itself). Other functions may also be used as appropriate, such as a bidirectional transmittance distribution function (BTDF), defining how light passes through a material, e.g. for subsurface scattering.

Figure 5:
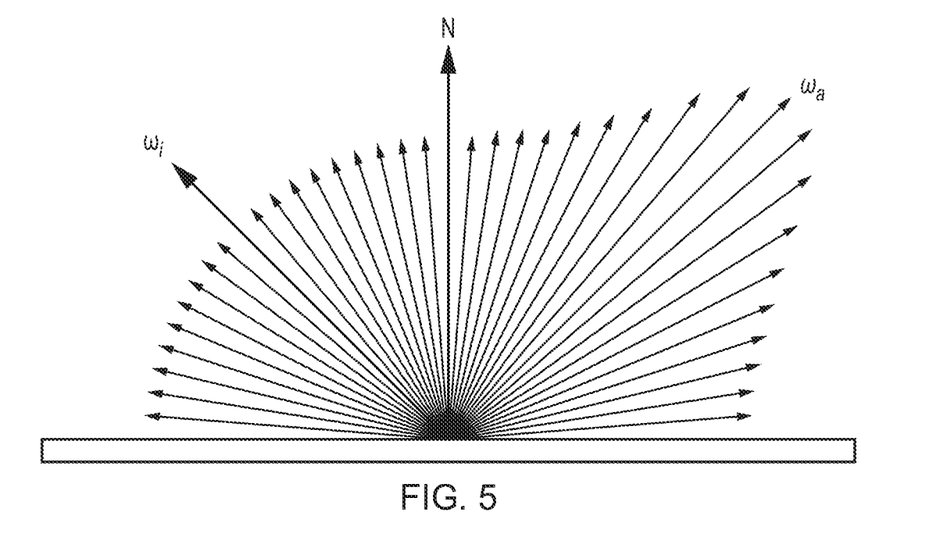
FIG. 5 is a schematic diagram of a scattering distribution in accordance with embodiments of the present description.

Referring also to FIG. 5, in a typical ray tracing application, for a set of rays (e.g. from a compact light source) the application computes the incoming radiance (itself either direct or previously reflected) onto a point on the model having a particular BSDF, BRDF, and/or BTDF. The incoming radiance is combined (e.g. multiplied) with the BSDF, BRDF, or BTDF for a particular contributing component response, and the result is added to the pixel value at that point on the model. As shown in FIG. 5, a typical scattering pattern for ray path $\omega_i$ in a BSDF will have a bias towards a mirror reflection direction $\omega_a$, but may scatter in any direction. Accurately modelling such behaviour is one reason ray tracing can be computationally expensive.

Using the colour information of the model at respective points and the corresponding BSDF, BRDF and/or BTDF for that point (i.e. for a particular material represented by a given point), the behaviour of the rays for a given final viewpoint can thus be calculated, with the ray reflectance or scattering for example determining the realistic distribution of glints and highlights on the surface of the vehicle.

Separate BSDFs, BRDFs, or BTDFs may be used for each contributing component; hence as a non-limiting example a BSDF may be used for the diffuse component, a BRDF for the specular component and in this example also a for the coat component (though a BTDF could also be used for such a coat component). It will be appreciated that either a BSDF, BRDF, or BTDF may be used as appropriate, and so hereinafter a reference to a BSDF encompasses a reference to a BRDF or a BTDF as appropriate, unless otherwise stated.

As shown in FIG. 4, performing ray tracing using the colour properties of the object and diffuse material properties of a BSDF (200-BSDF-D) results in the diffuse image component 200-D. Similarly using the specular or reflective material properties of a BSDF (200-BSDF-S) results in the specular image component 200-S. Likewise the material properties of a BSDF (200-BSDF-C), in this case typically also specular, results in a coat image component 200-C. Combining these components results in the final ray traced image 200.

The problem however, as previously stated, is that calculating the reflected and scattered paths of rays as they intersect with different surfaces having different BSDFs, and summing the results for each pixel of a scene at a particular viewpoint, is both computationally expensive and also potentially highly variable.

Embodiments of the present description therefore seek to replace the ray tracing step of FIG. 4 with something else that has a more predictable computational load for a suitable quality of final image.

Figure 6:
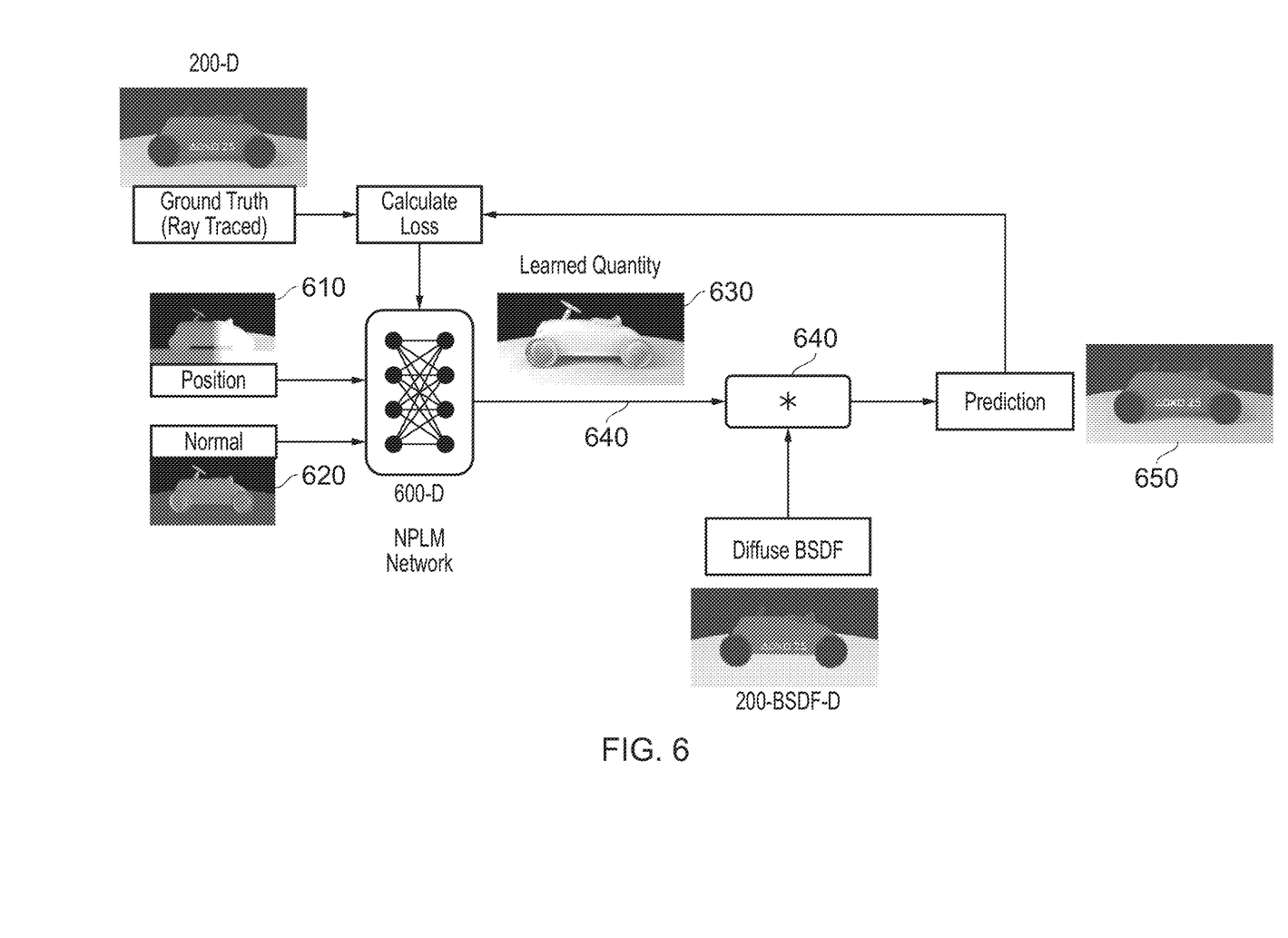
FIG. 6 is a schematic diagram of a training scheme for a machine learning system in accordance with embodiments of the present description.

Referring now also to FIG. 6, in embodiments of the present description, a respective machine learning system is provided for each contributing component of the image (e.g. diffuse, specular, and optionally coat or any other contributing component).

The machine learning system is typically a neural network, as described later herein, that is trained to learn a transform between the BSDF (e.g. 200-BSDF-D) and the ray-traced ground truth (e.g. 200-D) of the contributing component of the image, for a plurality of images at different viewpoints in the scene.

Put another way, if the ray traced image (or one of the contributing components) is a combination of how lighting plays over an object and the BSDF describing how that object reacts to light, then by taking the ray traced image and uncombining it with the BSDF, the result is a quality that may be referred to as 'radiance' or 'shade', but more generally describes how the light plays over the object (as computed in aggregate by the ray tracing process).

If the machine learning system or neural network can learn to predict this quality, then it can be combined again with the BSDF to produce a predicted image approximating the ray-traced image. The network may thus be referred to as a neural precomputed light model or NPLM network.

More specifically, for a given position on a hypothetical image of an object, and a direction of view, the machine learning system or neural network must learn to output a value that, when combined with the BSDF for that same position/pixel, results in a pixel value similar to that which would arise from raytracing the image at that pixel. Consequently during training it generates an internal representation of the lighting conditions (e.g. due to point lights or a skydome) and surface lighting properties implied from the training images.

Hence in an example embodiment, an image may be rasterised or otherwise generated at a given viewpoint, which would fill the image with pixels to then be illuminated. For each of these notional pixels there is a corresponding 3D position in the scene for which the appropriate 'radiance' or shade' can be obtained using the NPLM network.

FIG. 6 shows a training environment for such a network, and specifically as an example only, a network 600-D for the diffuse contributing component.

The inputs to the network for the diffuse contributing component are an (x,y,z) position 610 on the object or scene (for example corresponding to a pixel in the image) and the normal 620 of the object/scene at that point. The normal N is used instead of the viewpoint direction because for the diffuse contributing component, the illuminance can be considered direction/viewpoint independent, and so the normal, as a known value, can be used for consistency. These inputs are illustrated notionally in FIG. 6 using representative values of each for the car image in the present explanatory example.

Optionally additional inputs may be provided (not shown), such as a roughness or matt-to-gloss scalar value that may optionally be derived from the relevant BSDF.

The output of the NPLM network (as explained later herein) is a learned quality of light or illuminance 630 for the input position that, when combined 640 with the relevant diffuse BSDF (200-BSDF-D) for the same position produces a predicted pixel value for the (x,y) position in a predicted image 650.

FIG. 6 illustrates that the per-pixel difference between the predicted pixel and the ground truth pixel of a target ray-traced diffuse component 200-D is used as the loss function for training the network, but this is not necessary; rather, the ground truth image can be uncombined with the BSDF (i.e. by performing an inverse function) to produce an proxy for how the ray traced light cumulatively affected the object in the image for each (x,y) pixel, and this is the quality that the network is training to learn.

Hence the error function for the network is based on the difference between its single pixel (x,y) output value and the corresponding single (x,y) pixel of the ground truth image when uncombined from the corresponding BSDF for that position.

Since the pixels of the ground truth image can be uncombined from the corresponding BSDF for each position once in advance, the network can be trained without needing to combine its own output with any BSDF to generate an actual predicted image pixel. This reduces the computational load of training.

As noted above, the learned quality output by the trained neural network captures how the light in the environment plays over the object or scene as a function of the position of surfaces within the scene and as a function of viewpoint. As such it effectively generates an internal representation of a light map for the scene and a surface response model. How this occurs is discussed in more detail later herein.

Figure 7:
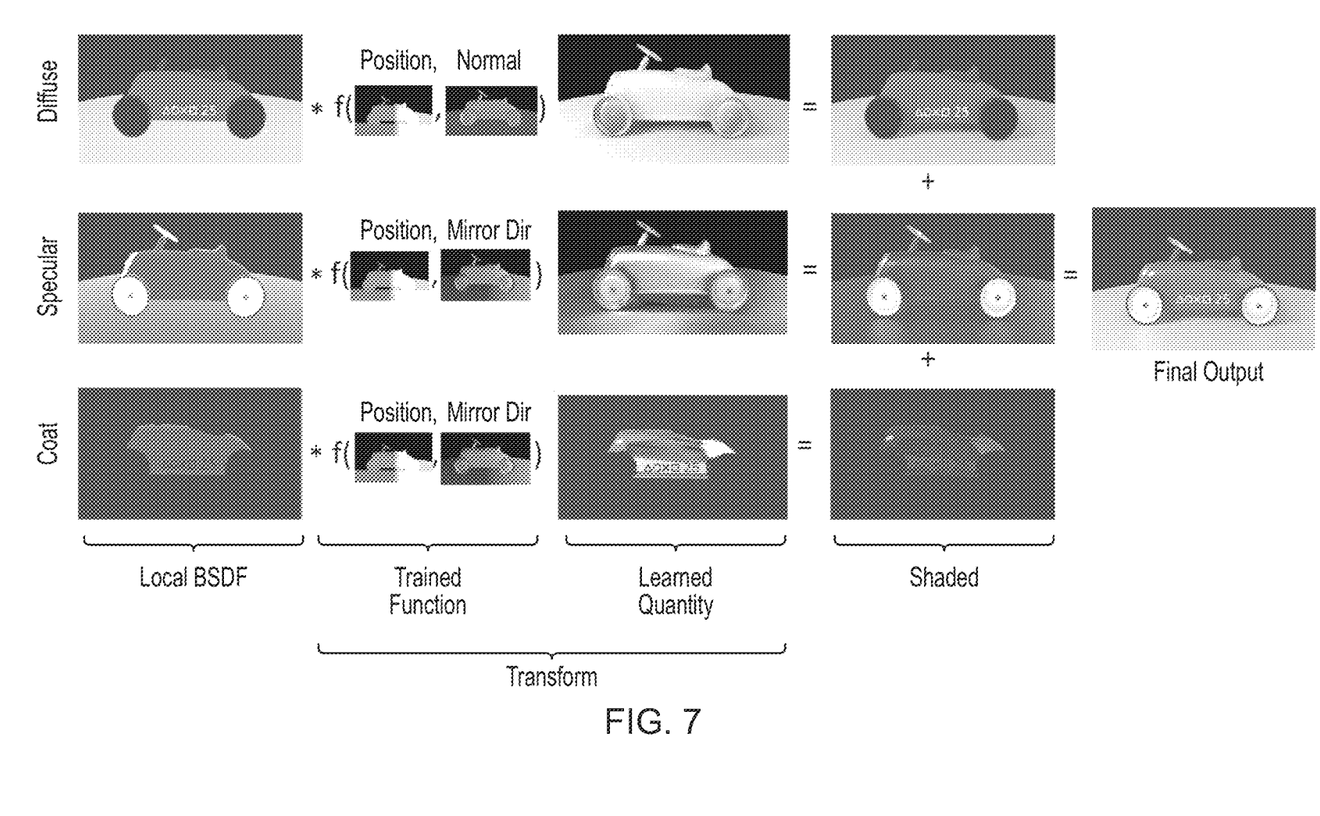
FIG. 7 is a schematic diagram of a render path for a rendered image in accordance with embodiments of the present description.

Referring now to FIG. 7, in summary for each contributing component of the final output image, a machine learning system is trained to perform a transform that is applied to the BSDF local to the position on the object/scene for that contributing component. The transform is a trained function, based on the (x,y,z) position of points on the object/scene and a direction value. As noted previously, depending on the number of contributing components of the final image, there may be any or one, two, three, four or possibly more machine learning systems employed. The term 'trained function' may be used hereafter to refer to a machine learning system that has learned such a transform.

As noted for the diffuse component the direction value can be assumed to equal the normal at a given point as the diffuse shading is assumed to be direction-invariant.

Meanwhile for the specular component, which is at least partially reflective and so will vary with view point, the direction value is or is based on the viewing angle between the (x,y) position of a current pixel at the image view point (which will have a position in the virtual space) and the (x,y,z) position of the object as input to the machine learning system, thereby providing a viewpoint dependent relationship between the input point on the scene surface and the current pixel for which the learned quantity is to be output.

In this case the coat component is also specular and so uses a similar viewpoint or viewpoint based direction for an input as well.

The direction value for direction dependent components may thus be the view direction between the output pixel position and the object surface position, or a value based on this, such as the surface mirrored viewpoint direction (i.e. the primary direction that the viewpoint direction would reflect in, given the normal of the surface at the input position). Any suitable direction value that incorporates information about the viewpoint direction may be considered.

In each case, the trained function encapsulates the learned quality, as described previously herein. Combining the appropriate BSDF with the network output for each position allows the shaded images for each component to be built up. Alternatively or in addition combining the pixel values for the shaded images from each component generates the final output.

It will be appreciated that during the rendering of an image, not all of the image may be subject to ray tracing, and similarly not all of an image may be generated using the above techniques. For example, NPLM networks may be trained for specific objects or materials based on ground truth ray traced images with representative lighting.

When these objects or materials are to be subsequently rendered in real time using the apparent ray tracing provided by the trained functions described herein, the relevant NPLM networks are loaded into memory and run for the relevant surface positions and viewing directions in the scene to produce their contributions to the relevant pixels, when combined with the appropriate BSDFs. Other pixels may be rendered using any other suitable techniques (including ray tracing itself).

Typically the appropriate the machine learning system(s) are selected and loaded into a memory used by the GPU based on the same asset identification scheme used for selecting and loading a texture for the object or material. Hence for example if an object has an ID '1234' used to access associated textures, then this ID can also be associated with the relevant machine learning system(s). Conversely if a texture has an ID '5678' that is associated with an object (e.g. where the texture represents a material common to plural objects), then this ID can also be associated with the relevant machine learning system(s). In this way the entertainment device can use a similar process to load the machine learning systems as it does to load the textures. It will be appreciated that the actual storage and access techniques may differ between textures and machine learning systems, particularly if textures are stored using lossy compression that would impact on the operation of a decompressed machine learning system. Hence the machine learning system may be stored without compression or using lossless compression, or lossy compression where the degree of loss is low enough that the decompressed machine learning system still operates adequately; this can be assessed by comparing the output error/cost function of the machine learning system for incremental degrees of loss in compression, until the error reaches an absolute or relative (to the uncompressed machine learning system) quality threshold.

Figure 8:
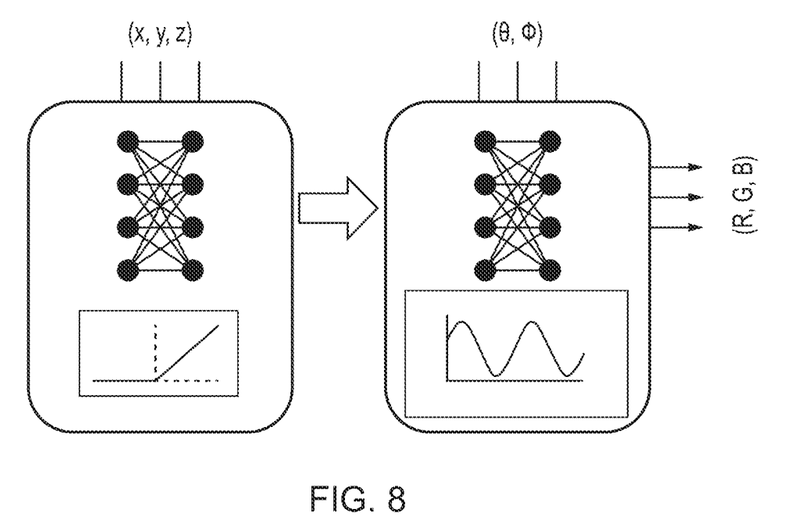
FIG. 8 is a schematic diagram of a machine learning system in accordance with embodiments of the present description.

Turning now to FIG. 8, in embodiments of the present description, the machine learning system or NPLM network may be any suitable machine learning system. Hence for example a single neural network may be trained using the position and viewpoint direction as inputs, and generate RGB values for the learned property as outputs.

However, a particularly advantageous network comprises a distinct split architecture.

As shown in FIG. 8, in a non-limiting example the network comprises two parts. The first part may be thought of as the position network, whilst the second part may be thought of as the direction network.

Each of these networks may have 3 or more layers, and use any suitable activation function.

The position network receives the previously mentioned (x, y, z) position for a point in the object/scene as input, and outputs an interim representation discussed later herein.

The direction network receives this interim representation and also the direction input (e.g. the normal, or the pixel viewpoint or surface point mirrored pixel viewpoint direction or other viewpoint based direction value, as appropriate) for example in a $(\theta, \phi)$ format, or as a normalised (x, y, z) vector, or similar. It outputs RGB values corresponding to the previously mentioned leaned quantity for the (x,y) position (and hence pixel viewpoint) of a current pixel in an image to be rendered from a virtual camera position in a space shared with the object/scene.

Hence in a non-limiting example, the position network has 3 layers, with 3 input nodes (e.g. for the x, y, z position) on the first layer, 128 hidden nodes on the middle layer, and 8 outputs on the final layer.

Whilst any suitable activation function may be chosen for the network, a rectified linear unit (ReLU) function has been evaluated as a particularly effective activation function between the layers of the position network. It generalizes well to untrained positions and helps to avoid overfitting.

Similarly in the non-limiting example, the direction network has 4 layers, with the 8 outputs of the position network and 2 or 3 additional values for the direction feeding into 128 nodes on a first layer, then feeding on to two further layers of 128 nodes, and a final 3 outputs on the final layer corresponding to R,G,B values for the learned quantity at the current pixel. This could then combined (e.g. multiplied) with the BSDF for that position to get the final pixel contribution from this trained function (e.g. diffuse, specular etc), though as noted previously this is not required during training.

Whilst any suitable activation function may be chosen for the direction network, a sine function has been evaluated as a particularly effective activation function between the layers of the direction network. Because the light behaviour variation in the angular domain is large and contains details at many angular frequencies, but is based on a low dimensional input (e.g. a normalised x,y,z vector), the sine activation function has been found to be particularly good.

Notably therefore the two halves of the network may use different activation functions.

The network however is treated as a split-architecture network rather than as two separate networks because notably the training scheme only has one cost function; the error between the RGB values output by the direction network and the target values from the corresponding pixel of the ground truth ray traced image, after being uncombined with the appropriate BSDF.

This error is back-propagated through both networks; there is no separate target value or cost function for the position network. Hence in practice the output layer of the position network is really a hidden layer of the combined network, augmented with additional inputs of direction values, and representing a transition from a first activation function to a possible second and different activation function within the layers.

As noted previously, the neural network builds a light model for the lit object, material, or scene. In particular, in the non-limiting example above the position network effectively sorts the (x, y, z) positions into lighting types (e.g. bright or dark, and/or possibly other categories relating to how the light interacts with the respective BSDF, such as relative reflectivity or diffusion); the interim representation output by this part may be thought of as an N-dimensional location in a lighting space characterising the type of light at the input position; it will project positions in different parts of the scene to the same N-dimensional location if they are lit in the same way. A position network trained for a specular component may have more outputs that one for a diffuse component; for example 32 outputs compared to 8, to take account of the greater variability in types of lighting that may occur in the specular component.

The direction network then models how light the light model behaves when viewed in the surface at the input position at a certain input angle for the lit object, material, or scene, to generate the learned property for that location in the image.

Hence in summary, the position and direction networks are trained together as one to predict a factor or transform between a BSDF descriptive of a surface property, and the desired rendered image of that surface. The networks can then be used instead of ray tracing for renders of that surface. Typically but not necessarily the networks are trained on just one contributing component of the image, such as the diffuse of specular component, with a plurality of networks being used to produce the components needed for the final image or image portion, although this is not necessary (i.e. in principle a network could be trained on a fully combined image or a combination of two or more contributing components, such as all specular or all diffuse contributions).

Training

The network is trained as described elsewhere herein using a plurality of ray traced images of the object, scene, or surface taken from a plurality of different viewpoints. This allows the network to lean in particular about how specular reflections change with position. The viewpoints can be a random distribution, or may for example be selected (or predominantly selected) from with a range of viewpoints available to the user when navigating the rendered environment.

Network Selection

The networks are trained during a game or application development phase. The developer may choose when or where NPLM based rendering would be advantageous. For example, it may only be used for scenes that are consistently found to cause a framerate below a predetermined quality threshold. In such cases, the networks are trained on those scenes or parts thereof, and used when those scenes are encountered.

In other cases, the developer may choose to use NPLM based rendering for certain objects or certain materials. In this case, the networks are trained for and used when those objects or materials are identified as within the scene to be rendered.

Similarly, the developer may choose to use NPLM based rendering for particular draw distances (z-distance), or angles/distance away from an image centre or user's foveal view, or for certain lighting conditions. In this case, the networks are trained for and used in those circumstances.

Similarly, it will be appreciate that any suitable combination of these criteria may be chosen for training and use.

Summary

Figure 9:
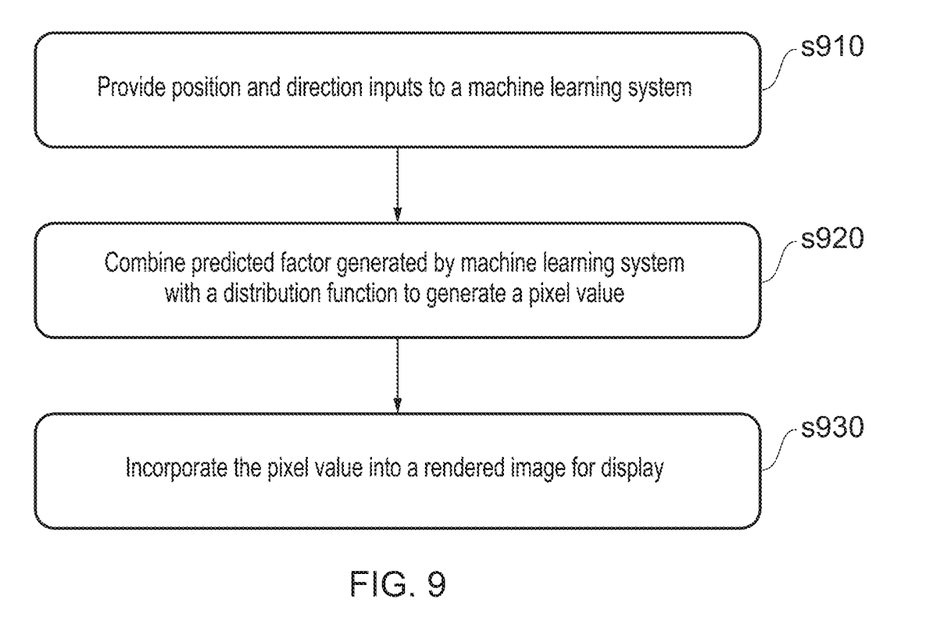
FIG. 9 is a flow diagram of an image rendering method in accordance with embodiments of the present description.

Referring now to FIG. 9, in a summary embodiment of the description, an image rendering method for rendering a pixel at a viewpoint comprises the following steps, for a first element of a virtual scene having a predetermined surface at a position within that scene.

In a first step s910, provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position, as described elsewhere herein.

In a second step s920, combine the predicted factor from the machine learning system with the distribution function to generate the pixel value corresponding to the illuminated first element of the virtual scene at the position, as described elsewhere herein.

And, in a third step s930, incorporate the pixel value into a rendered image for display, as described elsewhere herein. The image may then be subsequently output to a display via an A/V port (90).

It will be apparent to a person skilled in the art that one or more variations in the above method corresponding to operation of the various embodiments of the method and/or apparatus as described and claimed herein are considered within the scope of the present disclosure, including but not limited to that:

- a respective machine learning system is trained for each of a plurality of contributing components of the image (e.g. diffuse, specular, coat, etc), a respective distribution function is used for each of the plurality of contributing components of the image, and the respective generated pixel values are combined to create the pixel value incorporated into the rendered image for display, as described elsewhere herein;
- the respective distribution function is one or more selected from the list consisting of a bidirectional scattering distribution function, a bidirectional reflectance distribution function, and a bidirectional transmittance distribution function, as described elsewhere herein;
- the machine learning system is a neural network, an input to a first portion of the neural network comprises the position, and an input the a second portion of the neural network comprises the output of the first portion and the direction, as described elsewhere herein;
    - in this instance, an activation function of the first portion is different to an activation function of the second portion, as described elsewhere herein;
        - in this case, the activation function of the first portion is a ReLU function and the activation function of the second portion is a sin function, as described elsewhere herein;
    - in this instance, the cost function of the neural network is based on a difference between the output of the second portion and a value derived from a ray-traced version of the pixel for a training image on which an inverse combination with the distribution function has been performed, as described elsewhere herein;
    - in this instance, the cost function for the network is back-propagated though both the second and first portions during training, as described elsewhere herein;
    - in this instance, the neural network is a fully connected network, as described elsewhere herein;
- the cost function of the machine learning system is based on a difference between the output of the machine learning system and a value derived from a ray-traced version of the pixel for a training image on which an inverse combination with the distribution function has been performed, as described elsewhere herein; and
- the machine learning system is selected and loaded into a memory used by a graphics processing unit based on the same asset identification scheme used for selecting and loading a texture for the first element of the scene.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 1:
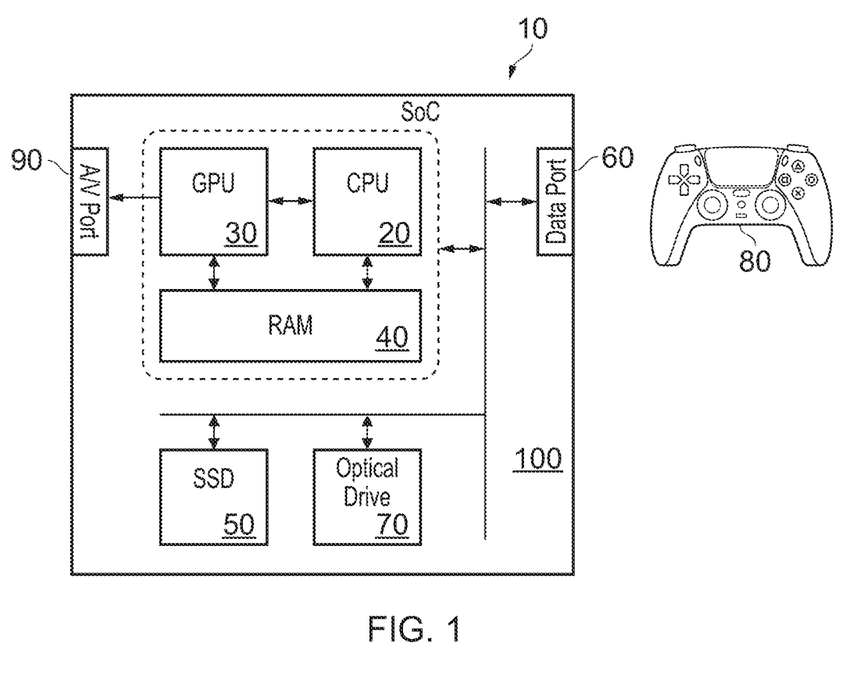
FIG. 1 is a schematic diagram of an entertainment device in accordance with embodiments of the present description.

Referring to FIG. 1, the methods and techniques described herein may be implemented on conventional hardware such as an entertainment system 10 that generates images from virtual scenes. An example of such an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

Accordingly, in a summary embodiment of the present description, an entertainment device (such as a Sony® Playstation 5® or similar), comprises the following.

Firstly, a graphics processing unit (such as GPU 30, optionally in conjunction with CPU 20) configured (for example by suitable software instruction) to render a pixel at a viewpoint within an image of a virtual scene comprising a first element having a predetermined surface at a position within that scene, as described elsewhere herein.

Secondly, a machine learning processor (such as GPU 30, optionally in conjunction with CPU 20) configured (for example by suitable software instruction) to provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position, as described elsewhere herein.

The graphics processing unit is configured (again for example by suitable software instruction) to combine the predicted factor from the machine learning system with the distribution function to generate the pixel value corresponding to the illuminated first element of the virtual scene at the position, as described elsewhere herein.

Further, the graphics processing unit is also configured (again for example by suitable software instruction) to incorporate the pixel value into a rendered image for display, as described elsewhere herein.

It will be appreciated that the above hardware may similarly be configured to carry out the methods and techniques described herein, such as that:

the entertainment device comprises a plurality of machine learning processors (e.g. respective processors, theads and/or shaders of a GPU and/or CPU) running respective machine learning systems each trained for one of a plurality of contributing components of the image (e.g. diffuse, specular, coat, etc), where a respective distribution function is used for each of the plurality of contributing components of the image, and the graphics processing unit is configured (again for example by suitable software instruction) to combine the respective generated pixel values to create the pixel value incorporated into the rendered image for display, as described elsewhere herein; and the or each machine learning system is a neural network, where an input to a first portion of the neural network comprises the position, and an input the a second portion of the neural network comprises the output of the first portion and the direction.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An image rendering method for rendering a pixel at a viewpoint, comprising the steps of:

for a first element of a virtual scene, having a predetermined surface at a position within that scene, providing the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;

combining the predicted factor from the machine learning system with the distribution function to generate the pixel value corresponding to the illuminated first element of the virtual scene at the position; and incorporating the pixel value into a rendered image for display, wherein a cost function of the machine learning system is based on a difference between the output of the machine learning system and a value derived from a ray-traced version of the corresponding pixel for a training image on which an inverse combination with the distribution function has been performed.

2. The image rendering method according to claim 1, in which a respective machine learning system is trained for each of a plurality of contributing components of the image;

a respective distribution function is used for each of the plurality of contributing components of the image; and the respective generated pixel values are combined to create a final combined pixel value incorporated into the rendered image for display.

3. The image rendering method according to claim 1, in which the respective distribution function is one or more of:

i. a bidirectional scattering distribution function;

ii. a bidirectional reflectance distribution function; and iii. a bidirectional transmittance distribution function.

4. The image rendering method according to claim 1, in which the machine learning system is a neural network;

an input to a first portion of the neural network comprises the position; and an input a second portion of the neural network comprises the output of the first portion and the direction.

5. The image rendering method according to claim 4, in which an activation function of the first portion is different to an activation function of the second portion.

6. The image rendering method according to claim 5, in which the activation function of the first portion is a rectified linear unit (ReLU) function and the activation function of the second portion is a sin function.

7. The image rendering method according to claim 4, in which a cost function of the neural network is based on a difference between the output of the second portion and a value derived from a ray-traced version of the corresponding pixel for a training image on which an inverse combination with the distribution function has been performed.

8. The image rendering method according to claim 4, in which a cost function for the network is back-propagated though both the second and first portions during training.

9. The image rendering method according to claim 4, in which the neural network is a fully connected network.

10. The image rendering method according to claim 1, in which the machine learning system is selected and loaded into a memory used by a graphics processing unit based on the same asset identification scheme used for selecting and loading a texture for the first element of the scene.

11. A non-transitory, computer readable storage medium containing a computer program comprising computer executable instructions, which when executed by a computer system, causes the computer system to perform an image rendering method for rendering a pixel at a viewpoint by carrying out actions, comprising:

for a first element of a virtual scene, having a predetermined surface at a position within that scene, providing the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;

combining the predicted factor from the machine learning system with the distribution function to generate the pixel value corresponding to the illuminated first element of the virtual scene at the position; and incorporating the pixel value into a rendered image for display, wherein a cost function of the machine learning system is based on a difference between the output of the machine learning system and a value derived from a ray-traced version of the corresponding pixel for a training image on which an inverse combination with the distribution function has been performed.

12. An entertainment device, comprising:

a graphics processing unit configured to render a pixel at a viewpoint within an image of a virtual scene comprising a first element having a predetermined surface at a position within that scene;

a machine learning processor configured to provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;

the graphics processing unit being configured to combine the predicted factor from the machine learning system with the distribution function to generate the pixel value corresponding to the illuminated first element of the virtual scene at the position; and the graphics processing unit being configured to incorporate the pixel value into a rendered image for display, wherein a cost function of the machine learning system is based on a difference between the output of the machine learning system and a value derived from a ray-traced version of the corresponding pixel for a training image on which an inverse combination with the distribution function has been performed.

13. An entertainment device according to claim 12, comprising:

a plurality of machine learning processors running respective machine learning systems each trained for one of a plurality of contributing components of the image, where a respective distribution function is used for each of the plurality of contributing components of the image; and the graphics processing unit is configured to combine the respective generated pixel values to create a final combined pixel value pixel value incorporated into the rendered image for display.

14. An entertainment device according to claim 12, in which:

the machine learning system is a neural network;

an input to a first portion of the neural network comprises the position; and an input to a second portion of the neural network comprises the output of the first portion and the direction.

* * * * *